(12) United States Patent
Zell et al.

(10) Patent No.: US 11,293,485 B2
(45) Date of Patent: Apr. 5, 2022

(54) MULTI-ROW ROLLING BEARING

(71) Applicant: Liebherr-Components Biberach GmbH, Biberach an der Riss (DE)

(72) Inventors: Robert Zell, Schemmerhofen (DE); Markus Ruf, Bad Waldsee (DE); Michael Fuchs, Herbrechtingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 16/923,958

(22) Filed: Jul. 8, 2020

(65) Prior Publication Data

US 2020/0408251 A1    Dec. 31, 2020

Related U.S. Application Data

(63) Continuation of application No. PCT/EP2019/050368, filed on Jan. 9, 2019.

(30) Foreign Application Priority Data

Jan. 16, 2018 (DE) ..................... 20 2018 100 216.3

(51) Int. Cl.
| | |
|---|---|
| *F16C 19/38* | (2006.01) |
| *F16C 19/50* | (2006.01) |
| *F16C 33/54* | (2006.01) |
| *F16C 33/58* | (2006.01) |
| *F16C 33/60* | (2006.01) |

(52) U.S. Cl.
CPC .......... *F16C 19/386* (2013.01); *F16C 19/505* (2013.01); *F16C 33/545* (2013.01); *F16C 33/581* (2013.01); *F16C 33/583* (2013.01); *F16C 33/60* (2013.01);

(Continued)

(58) Field of Classification Search
CPC ...... F16C 19/30; F16C 19/381; F16C 19/383; F16C 19/386; F16C 19/505; F16C 19/545; F16C 33/581; F16C 33/583; F16C 33/60; F16C 2240/30; F16C 2240/34;

(Continued)

(56) References Cited

U.S. PATENT DOCUMENTS

| | | | | |
|---|---|---|---|---|
| 2,594,578 A | * | 4/1952 | McNicoll | .............. F16C 19/385 |
| | | | | 384/455 |
| 3,652,141 A | * | 3/1972 | Husten | .................. F16C 19/381 |
| | | | | 384/455 |

(Continued)

FOREIGN PATENT DOCUMENTS

| | | |
|---|---|---|
| CH | 386188 | 12/1964 |
| CN | 101589241 | 11/2009 |

(Continued)

*Primary Examiner* — Marcus Charles
(74) *Attorney, Agent, or Firm* — Levine Bagade Han LLP

(57) ABSTRACT

A multi-row rolling bearing having an inner ring and an outer ring and at least two axial rolling bearing rows for supporting axial forces between the inner and outer ring, wherein the two axial rolling bearing rows are seated on opposite axial sides of a radially projecting annular lug which engages in an annular groove and which is supported by means of the axial rolling bearing rows against the annular groove. According to the invention, at least one of the axial rolling bearing rows is formed as an angular-contact roller bearing with an angle of inclination of greater than 0° to at most 45°.

20 Claims, 3 Drawing Sheets

(52) U.S. Cl.
CPC ...... *F16C 2240/30* (2013.01); *F16C 2300/14* (2013.01); *F16C 2361/61* (2013.01)

(58) Field of Classification Search
CPC .............. F16C 2300/14; F16C 2350/00; F16C 2360/31; F16C 2240/70; F16C 2361/61
USPC .......... 384/502, 550, 561, 564–565, 570–572
See application file for complete search history.

(56) References Cited

U.S. PATENT DOCUMENTS

| | | | |
|---|---|---|---|
| 5,125,756 | A | 6/1992 | Bossler, Jr. |
| 5,222,817 | A * | 6/1993 | Glazier ................ F16C 35/073 384/559 |
| 9,062,661 | B2 * | 6/2015 | Frank .................... F16C 19/381 |
| 10,677,290 | B2 * | 6/2020 | Birkenstock ............ F03D 80/70 |
| 2020/0063799 | A1 * | 2/2020 | Pilk .................... F16C 33/7896 |

FOREIGN PATENT DOCUMENTS

| | | | | |
|---|---|---|---|---|
| CN | 101900161 | | 12/2010 | |
| CN | 202091356 | | 12/2011 | |
| CN | 102695886 | | 9/2012 | |
| CN | 103261717 | | 8/2013 | |
| CN | 103906935 | | 7/2014 | |
| CN | 102734320 | | 3/2016 | |
| DE | 17558 | | 10/1959 | |
| DE | 1971842 | | 11/1967 | |
| DE | 102006056186 | A1 * | 6/2008 | ............ F16C 19/38 |
| DE | 202010002282 | | 5/2010 | |
| DE | 202010009404 | | 12/2010 | |
| DE | 202011110141 | U1 * | 12/2012 | ............ F03D 80/70 |
| DE | 102011083824 | | 4/2013 | |
| DE | 102006054453 | | 10/2016 | |
| DE | 102015112056 | A1 * | 1/2017 | ............ F16C 23/08 |
| DE | 102015214330 | A1 * | 2/2017 | ............ F03D 80/70 |
| DE | 202014010876 | | 4/2017 | |
| EP | 3591245 | A1 * | 1/2020 | ............ F03B 11/06 |
| WO | WO-2006131301 | A2 * | 12/2006 | ............ F03D 80/70 |
| WO | WO-2009013047 | A1 * | 1/2009 | ............ F16D 69/00 |
| WO | WO 2019/141548 | | 7/2019 | |

* cited by examiner

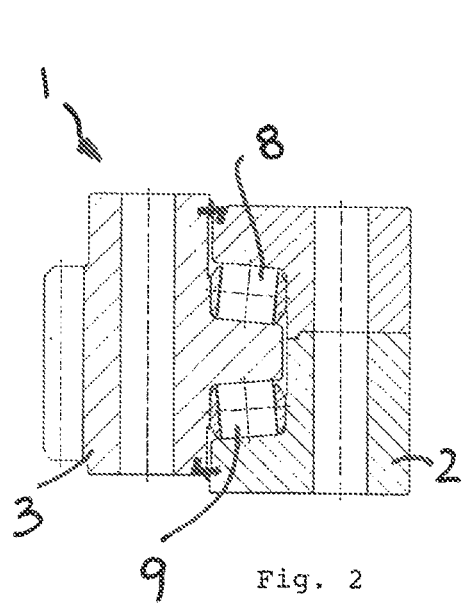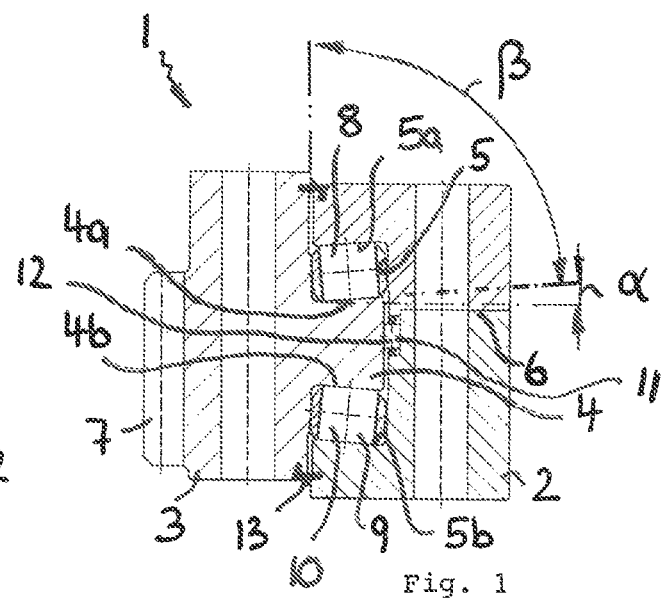

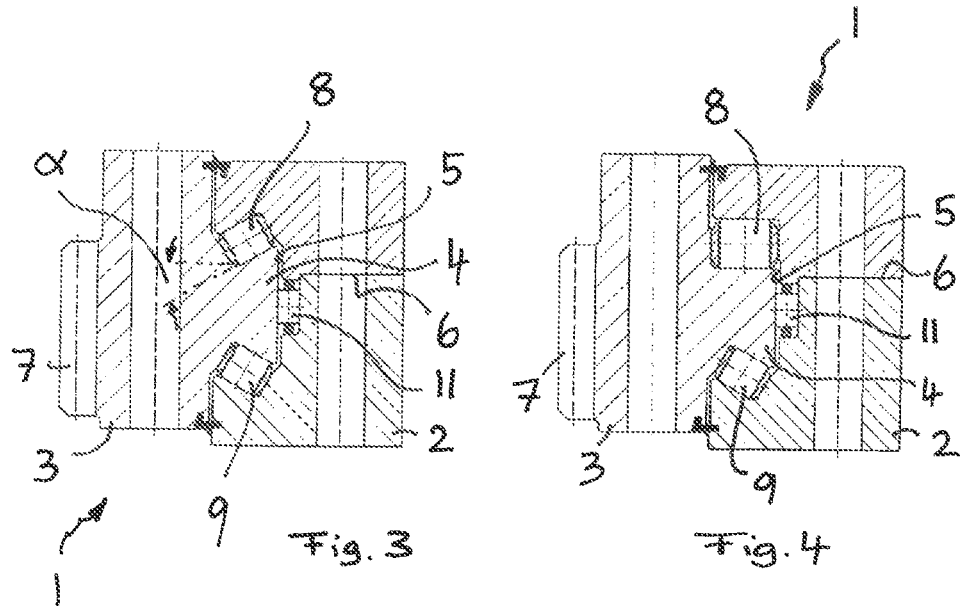

NOT INVENTION

MULTI-ROW ROLLING BEARING

CROSS-REFERENCE TO RELATED APPLICATIONS

This application is a continuation of International Patent Application Number PCT/EP2019/050368 filed Jan. 9, 2019, which claims priority to German Patent Application Number 20 2018 100 216.3 filed Jan. 16, 2018, the contents of which are incorporated herein by reference in their entireties.

BACKGROUND

The present invention relates to a multirow roller bearing having an inner ring and an outer ring as well as at least two axial roller bearing rows for supporting axial forces between the inner and outer ring, wherein the two axial roller bearing rows are seated on oppositely disposed axial sides of a radially projecting ring nose that engages in a ring groove and that is supported by the axial roller bearing rows at the ring groove.

Large roller bearings are as a rule used in applications in which high axial forces have to be intercepted that act at least approximately in parallel with the axis of rotation of the bearing while radial forces acting transversely to the axis of rotation only play a subordinate role. In this respect, large roller bearings are often formed as open centered and a ring cross-section is small in comparison with the very large diameter, i.e. the cross-section dimensions of the outer and inner rings are very small in comparison with their diameters that can amount to a plurality of meters. The surrounding connection design to which the inner and outer rings are fastened hereby has a great influence on the support and deformation behavior of the roller bearing.

To avoid a lifting off of the axial roller bearings in an unloaded sector with axial forces distributed unevenly over the periphery, the two rings are often supported at one another in the manner via a radially projecting ring nose, wherein the axial roller bearing rows between the ring groove and the ring nose are arranged on oppositely disposed axial sides of the ring nose to support the ring nose in both directions. Such uneven axial forces can be produced, for example, in cranes or excavators whose superstructures are rotatably supported by such a large roller bearing at the undercarriage, with here one of the inner and outer rings being able to be provided with a toothed portion to integrate a rotary drive into the large roller bearing. The rotary connection is loaded very differently viewed over the periphery due to the components acting on the superstructure, with axial forces pressing strongly down in one sector and axial forces pulling up in an oppositely disposed sector, for example, being able to act.

Even if such axial forces can be intercepted by the at least two axial roller bearing rows that engage at oppositely disposed sides of the ring nose, it is meaningful also to ensure a removal of radial loads or to counteract radial movements of the inner and outer rings relative to one another. Such radial movements can be produced, on the one hand, by accrued radial loads, but can also arise due to deformations of the bearing rings, in particular with more yielding connection designs. The inner and outer rings can, for example, attempt to move one another in one sector, i.e. the ring nose would attempt to penetrate deeper into the ring groove, while a running apart of the rings can be impending in an oppositely disposed sector, i.e. the ring nose would attempt to move a little out of the ring groove.

To prevent such possible radial movements or to intercept radial forces, it is therefore known to provide a radial bearing row between the ring nose and the ring groove that supports the projecting end face of the ring nose at the base of the ring groove, such as is shown in FIG. 5. If larger radial loads have to be removed or if greater deformations occur due to high, uneven loads, a single radial bearing is at times no longer sufficient to prevent deformations of the bearing rings and to sufficiently counteract a moving in or moving away of the inner and outer rings. It is therefore proposed in document DE 10 2006 054 453 B4 to radially support the nose ring by two radial bearings that are arranged on oppositely disposed sides of the nose ring. Such a plurality of radial bearing rows on oppositely disposed sides of the ring nose make the rotary connection relatively bulky overall and increase its design dimensions. It would, however, in particular be important to build in a space saving manner with large roller bearings in which a ring having a toothed portion is provided for a rotary drive.

It is the underlying object of the present invention to provide an improved multirow large roller bearing that avoids disadvantages of the prior art and further develops the latter in an advantageous manner. Radial deformations and movements of the rings relative to one another should in particular also be prevented with large loads and radial forces should be intercepted without having to do so by a bulky large-design of the roller bearing with increased cross-sectional dimensions of the bearing rings.

SUMMARY

The object is achieved in accordance with the invention by a multirow roller bearing in accordance with claim 1. Preferred embodiments of the invention are the subject of the dependent claims.

It is therefore proposed to intercept at least some of the radial forces and radial deformations by the axial roller bearing rows that are configured such that they can also remove radial forces and radial deformations. In accordance with the invention, at least one of the axial roller bearing rows is formed as a taper roller bearing having an inclination angle of more than 0° to a maximum of 45°. Such a preferably relatively small inclination angle of, for example, 5° to 30° or 10° to 25° reduces the axial bearing capacity, that is per se still in the foreground, in a hardly noticeable manner while at the same time the radial forces and radial deformations occurring in specific load cases can be sufficiently intercepted so that at least no second radial bearing row is required. The bearing can hereby be formed as small in design and compact despite a sufficient radial bearing capacity. The design height in particular does not increase and sufficient construction space remains for the connection environment, in particular for rotary drives, when one of the rings is provided with a toothed portion for a rotary drive.

In an advantageous further development of the invention, both axial roller bearing rows, that are arranged on oppositely disposed axial sides of the ring nose, can be formed as taper roller bearings and can have approximately the same inclination angle by amount.

Alternatively, only one of the two axial roller bearing rows can also be formed as a taper roller bearing while the other of the two axial roller bearings can form a purely axial bearing, with in this case, an additional radial bearing being able to help intercept radial forces.

The two axial roller bearing rows can in particular be inclined such that the axial roller bearing rows counteract a penetration of the ring nose into the ring groove. In this respect, the axial bearing surfaces on which the rolling elements of the axial roller bearing rows run can be inclined so much at the ring nose that the ring nose tapers toward the base of the ring groove, whereby a tendency of the ring nose to move deeper into the ring groove and thus a moving in tendency of the two inner and outer rings is counteracted.

With such an inclination of the axial bearings that counteracts a moving in of the inner and outer rings in an advantageous further development of the invention separate radial bearings between the ring nose and the ring groove and in particular radial bearings at another point between the inner ring and the outer ring can be completely dispensed with, whereby a very compact, space saving construction can be achieved. The radial forces and impending radial deformations are intercepted solely by the inclined axial roller bearings.

In an advantageous further development of the invention, the at least two axial roller bearing rows can, however, also be inclined such that the two axial roller bearing rows counteract a moving away of the ring nose from the ring groove. In this respect, the raceways for the rolling elements of the axial roller bearing rows can be inclined on oppositely disposed axial sides of the ring nose such that the ring nose—viewed in cross-section—widens toward the base of the ring groove. The ring nose so-to-say spreads out toward the base of the groove ring.

With such an inclination of the axial roller bearing rows that prevents a widening of the bearing rings, a radial bearing can additionally be provided in a further development of the invention, that counteracts a moving in of the inner and outer rings. Such an additional radial bearing can in particular be arranged between the projecting end face of the ring nose and the base of the ring groove.

The roller bearing advantageously has a maximum of one radial bearing row. A compact design can hereby be ensured.

The inclined axial roller bearings can each be formed in one row or in multiple rows. With a multirow design, two or also more rows of rolling elements can roll off next to one another on the same axial track or can also run on separate axial tracks.

With the multirow design of the axial roller bearings, the rolling element rows arranged next to one another can have the same inclination or can roll off on inclined axial tracks aligned in parallel with one another, with the axial tracks advantageously being oriented in opposite senses to one another on oppositely disposed axial sides of the ring nose to counteract a moving in of the inner and outer rings or a running apart of the inner and outer rings in the described manner.

It would, however, alternatively, also be possible to preferably arrange two inclined axial roller bearing rows, that are inclined at opposite senses to one another, on each of the oppositely disposed axis sides of the ring nose so that the one inclined rolling element row counteracts a moving in of the inner and outer rings and the other rolling element row counteracts a running apart of the inner and outer rings.

The inclination angle can here be selected differently within the range in dependence on the application, with a larger inclination angle being selected to accept stronger radial forces and a rather smaller inclination angle being selected to have lower losses in the axial load capacity. In an advantageous further development of the invention, the axial tracks of the axial roller bearing rows can have an inclination angle of less than 10°, in particular in the range from 1° to 10°, with a favorable all-round configuration being able to be achieved with an inclination angle of 2° to 8° or 3° to 7°.

For applications in which, for example, ring deformations and radial loads are in the foreground due to more yielding constructions, while the axial load capacity less forms the focus, the axial roller bearing rows can also have a larger inclination angle, for example in the range from 10° to 35° or in the range from 15° to 30°, with generally, however, inclination angles of up to 45° being able to be considered.

The axial tracks at the ring nose and the axial tracks at the side flanks of the ring groove can advantageously each have the same inclination angle, with at least associated axial tracks at the ring nose and at the ring groove, on which the same rolling element rolls of, being able to have the same inclination angle, while the axial tracks on different sides of the ring nose, that is, for example, the ring nose axial tracks and the ring groove axial tracks on an upper side, on the one hand, and the ring nose axial tracks and ring groove axial tracks on a lower side of the ring nose, on the other hand, can have different inclination angles.

In an advantageous further development of the invention, however, all the axial tracks at the ring nose and at the ring groove can have the same inclination angle by amount.

The rolling elements are formed as cylinder rollers in an advantageous further development of the invention. In general, providing tapered roller bearings could also be considered. To achieve particularly high load capacities, however, cylinder rollers can be inclined in the manner and can form the axial roller bearing rows.

To have a particularly compact design, it can be advantageous if the inner and outer rings are supported with respect to one another by a total of exactly two axial bearing rows that are arranged at oppositely disposed sides of the ring groove. If an additional radial bearing is provided, the inner and outer rings can be supported with respect to one another by a total of three bearing rows comprising the two axial bearing rows. If no radial bearing is provided in the aforementioned manner, the two the axial bearings can form the only bearing rows.

The at least two axial roller bearing rows that lie on oppositely disposed axial sides of the ring nose can, in a further development of the invention, have approximately the same diameter and/or can be arranged aligned with one another in the axial direction on the ring nose. It would generally be conceivable to arrange the two bearing rows offset form one another or on different pitch circle diameters. To also achieve a symmetrical force and torque removal with different directions of rotation of the moments of tilt, it can, however, be advantageous to arrange the axial roller bearing rows distributed symmetrically.

The axial roller bearing rows can advantageously be at least approximately dimensioned the same, can in particular have cylinder rollers of the same diameter and/or the same width, and/or can also be configured approximately identical to one another with respect to their pressure angles.

The raceways of the axial roller bearing rows and optionally also the raceways of the optional radial roller bearing row can advantageously be formed integrally in one piece with material homogeneity at the outer and inner rings, in particular at the axial sides of the aforementioned ring nose and the lateral flanks of the ring groove. Raceway inserts such as bearing wires and the like can in particular be dispensed with.

At least one of the inner and outer rings can be formed in multiple parts, in particular in two parts, with the ring that has the ring groove advantageously being divided into two parts or into multiple parts. A dividing plane can here advantageously extend at least approximately perpendicular to the axis of rotation of the roller bearing and/or can share the ring groove in the region of the base of the ring groove.

The bearing ring having the ring nose can advantageously be formed in one piece, with here a multipart design also being possible, however, in particular when, for example, a toothed portion is molded to the ring, with such a toothed portion also being able to be molded integrally in one piece, however.

The ring nose can advantageously be provided at the outer ring and the ring groove at the inner ring, advantageously when a toothed portion for a rotary drive is provided at the outer ring. It would, however, generally also be possible in an alternative embodiment of the invention to apply the ring nose to the inner ring and the ring groove to the outer ring.

BRIEF DESCRIPTION OF THE DRAWINGS

The invention will be explained in more detail in the following with reference to embodiments and to associated drawings. There are shown in the drawings:

FIG. 1: a partial sectional view of a roller bearing in accordance with an embodiment of the invention in which two axial roller bearing rows are inclined such that the axial roller bearing rows counteract a radial moving away of the two bearing rings, with an additional radial bearing counteracting a moving in of the bearing rings, FIG. 2: a partial sectional view of a roller bearing in accordance with a further advantageous embodiment of the invention in which two axial roller bearing rows are inclined such that the axial roller bearing rows counteract a radial moving in of the two bearing rings, with an additional radial bearing being completely dispensed with, FIG. 3: a partial sectional view of a roller bearing similar to FIG. 1 in accordance with a further embodiment of the invention in which the two axial roller bearing rows are more inclined than in FIG. 1, FIG. 4: a partial sectional view of a roller bearing similar to FIGS. 1 and 3 in accordance with a further embodiment of the invention in which only one of the axial roller bearing rows is inclined to counteract a radial moving away of the two bearing rings, while the other axial roller bearing is formed as a purely axial roller bearing without inclination.

DETAILED DESCRIPTION

Figure 5:
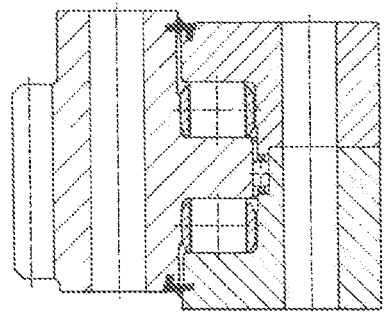
FIG. 5: a partial sectional view of a conventional non-inclined roller bearing in a three-row design.

As the Figures show, the roller bearing 1 comprises an inner ring 2 and an outer ring 3 that are rotatably supported with respect to one another by a plurality of roller bearing rows, with the roller bearing rows being able to be arranged between a radially projecting rig nose 4 and a ring groove 5 into which the ring nose 4 engages.

As FIG. 1 shows, the ring nose 4 can be provided at the outer ring 3 and can project radially inwardly from the inner periphery of the outer ring 3, with in this case the ring groove 5 being able to be provided at the inner ring 2 and being able to be formed in its outer periphery. Independently of the provision at the inner ring or outer ring, the ring nose 4 can be provided approximately centrally at half the height of the respective bearing ring, which can also apply to the ring groove 5 at the respective other bearing ring.

As the Figures show, the bearing ring—in the case of FIG. 1 the inner ring 2—having the ring groove 5 can be configured as divided, with the dividing plane 6 being able to be oriented approximately perpendicular to the axis of rotation of the roller bearing 1 and/or being able to extend through the base of the ring groove 5. The dividing plane 6 here advantageously extends off center with respect to the base of the ring groove 5, for example at approximately a third or two thirds of the height or width of the ring groove 5 to not be in the region of the axial roller bearings, on the one hand, and to not lie in the region of any radial bearing, on the other hand.

The ring nose 4—in the case of the drawings the outer ring 3—having the ring nose can be formed in one piece and can optionally have a toothed portion 7 at which the pinion of a rotary drive of a slewing gear can engage. The toothed portion 7 can, for example, be provided at the outer peripheral side of the outer ring 3.

As the Figures show: the roller bearing 1 can have two axial roller bearing rows 8 and 9 that can be arranged on oppositely disposed axial sides of the ring nose 4 and that can support the ring nose 4 at the flanks of the ring groove 5. The axial roller bearing rows 8 and 9 are here advantageously both formed as taper roller bearings having an inclination angle in the range from more than 0° to a maximum of 45°, with the inclination angle α advantageously being able to be in the range from more than 10° to 30° or 15° to 25°.

The rolling element 10 of the taper roller bearings are here advantageously cylinder rollers that run on inclined axial tracks 4a and 4b at the ring nose 4 and axial tracks 5a and 5b at the ring groove 5. The axial tracks 4a and 4b of the ring nose 4 and the axial tracks 5a and 5b at the side flanks of the ring groove 5 can be inclined in the same manner, i.e. can have the same inclination angle α that can be measured with respect to a plane perpendicular to the axis of rotation of the roller bearing 1.

The cylinder rollers can here generally be dimensioned differently, with it being able to be advantageous if the cylinder diameter roughly approximately amounts to the cylinder width, for example 75% to 150% of the cylinder width, with different cylinder geometries also being able to be selected, however.

As the Figures show, the axial roller bearing rows 8 and 9 can be oriented aligned with one another viewed in the axial bearing direction or can be arranged on the same pitch circle diameter.

As the Figures show, the angle β between the respective axial tracks 4, 4b or 5a, 5b and the lateral run-on surface for the rolling elements 10 can advantageously be formed as 90° or less and/or can be selected independently of the inclination angle α of the axial track. In FIG. 1, the angle β is entered for a raceway 4a of the ring nose 4 and for an associated lateral run-on surface of the outer ring 3. Analogously, the angle β can, however, also be selected between an axial track 5a or 5b at the ring groove side and the associated lateral run-on surface of the inner ring 2.

As FIGS. 1 and 3 show, the axial roller bearing rows 8 and 9 can be inclined or the angle α can be oriented such that the axial roller bearing rows 8 and 9 counteract a moving away of the ring nose 4 from the ring groove 5. The ring nose 4 can in particular spread toward the base of the ring groove 5 due to the inclination of the axial tracks 4a and 4b so that the axial roller bearing rows 8 and 9 hold the ring nose 4 in the ring groove 5 and counteract a running apart of the inner ring 2 and the outer ring 3.

As FIG. 1 shows, each of the axial roller bearing rows 8 and 9 can have an inclination angle α of, for example, approximately 5°. Alternatively, FIG. 3 shows an embodiment having more inclined axial roller bearing rows 8 and 9, with the inclination angle α here being able to amount to 30°, for example.

In order also to counteract a moving in of the outer ring 3 to the inner ring 2, i.e. a deeper dipping of the ring nose 4 into the ring groove 5, the roller bearing 1 can have, in addition to the two axial roller bearing rows 8 and 9, a radial roller bearing row 11 that can advantageously be arranged between the end face of the ring nose 4 and the base of the ring groove 5, in particular approximately centrally between the two axial roller bearing rows 8 and 9. The radial roller bearing row 11 can here likewise have cylinder rollers, but optionally also differently shaped rolling elements.

The rolling elements 12 of the radial roller bearing row 11 are advantageously dimensioned considerably smaller than the rolling elements 10 of the axial roller bearing rows 8 and 9. The diameter of the rolling elements 12 of the radial roller bearing row 11 can, for example, amount to less than 50% or less than 30% of the diameter of the rolling elements 10 of the axial roller bearing rows 8 and 9.

As FIG. 4 shows, only one axial roller bearing row 9 can optionally also be inclined, for example at an inclination angle α in the range from 5° to 45° or 10° to 35° or 15° to 30°, for example 30°. The other axial roller bearing row 8 can form a purely axial bearing and/or can be formed without a bevel so that the main direction of moving away of this second axial roller bearing row 8 extends in the axial direction.

In such an embodiment with only one inclined axial roller bearing row 9, the inclination can be established in the manner described above such that a moving away of the ring nose 4 from the groove is counteracted. To also counteract a moving in or dipping, a radial bearing 11 can likewise be used in the manner described above that can advantageously be arranged between the two axial roller bearing rows 8 and 9 when viewed in the radial direction, cf. FIG. 4.

In the embodiment in accordance with FIG. 2, the axial roller bearing rows 8 and 9 are inclined so-to-say oppositely in comparison with FIG. 1 so that the axial roller bearing rows 8 and 9 do not counteract a running apart, but rather counteract a moving in of the inner and outer rings 2 and 3, i.e. the axial roller bearing rows 8 and 9 counteract a deeper dipping of the ring nose 4 into the ring groove 5. As FIG. 2 shows, the axial tracks 4a and 4b can the inclined at the ring nose 4 such that the ring nose 4 tapers toward the base of the ring groove 5 in the region of the axial tracks 4a and 4b.

Since a moving in of the outer ring 3 to the inner ring 2 is also prevented in the radial direction by the inclination of the axial roller bearing rows 8 and 9, an additional radial bearing can be completely dispensed with in the embodiment in accordance with FIG. 2 so that the roller bearing 1 is formed with only two rows in total and all the axial and radial forces are only absorbed by the two the axial roller bearing rows 8 and 9.

Reference can be made in another respect to the description of FIGS. 1 and 3 that also applies to FIG. 2 to this extent with regard to the remaining design of the inner and outer rings 2 and 3, to the inclination of the axial tracks 4a, 4b and 5a, 5b, to the formation of the rolling elements 10, and to the angles α and β.

Even if it is not shown separately in the embodiment of FIG. 2, the inclination angle α can optionally be selected as larger, for example approximately 30°. It can also be considered here to only incline one of the two axial roller bearing rows while the other one of the two axial roller bearing rows can have no inclination or can be formed as a purely axial bearing.

In comparison with FIGS. 1 and 2, FIG. 5 shows a conventional roller bearing 1 per se with non-inclined axial roller bearings.

All the roller bearings 1 in accordance with FIG. 1 or FIG. 2 can be sealed by a seal 13 in the region of the gap between the two inner and outer rings 2 and 3.

The inner ring 2 and/or the outer ring 3 can each be formed in a segmented manner.

We claim:

1. A multirow roller bearing, comprising:
   an inner ring and an outer ring;
   at least two axial roller bearing rows for supporting axial forces between the inner ring and the outer ring, wherein the at least two axial roller bearing rows comprise a first axial roller bearing row and a second axial roller bearing row; and
   a radial roller bearing row,
   wherein the first axial roller bearing row and the second axial roller bearing row are seated on opposite axial sides of a ring nose that extends radially into a ring groove and that is supported by the first axial roller bearing row and the second axial roller bearing row at the ring groove,
   wherein the first axial roller bearing row comprises first cylindrical rollers rollable on a first pair of axial tracks, wherein the first pair of axial tracks are parallel to each other and inclined at a first inclination angle in a range from more than 0° to a maximum of 45°,
   wherein the second axial roller bearing row comprises second cylindrical rollers rollable on a second pair of axial tracks, wherein the second pair of axial tracks are parallel to each other and inclined at a second inclination angle in a range from more than 0° to a maximum of 45°, wherein the second inclination angle is the same as or different than the first inclination angle,
   wherein an axis of rotation of one of the first cylindrical rollers intersects an axis of rotation of one of the second cylindrical cylinders,
   wherein the first axial roller bearing row and the second axial roller bearing row are inclined such that the first axial roller bearing row and the second axial roller bearing row inhibit radial movement of the ring nose out of the ring groove,
   wherein the radial roller bearing row inhibits radial movement of the ring nose into the ring groove,
   wherein the radial roller bearing row is between an end face of the ring nose and a base of the ring groove, and
   wherein the radial roller bearing row is approximately centrally between the first axial roller bearing row and the second axial roller bearing row.

2. The multirow roller bearing of claim 1, wherein the first inclination angle is in a range from more than 0° to a maximum of 10° or in a range from 1° to 8°, and wherein the second inclination angle is in a range from more than 0° to a maximum of 10° or in a range from 1° to 8°.

3. The multirow roller bearing of claim 1, wherein the first inclination angle is in a range from more than 10° to 35° or in a range from 15° to 30°, and wherein the second inclination angle is in a range from more than 10° to 35° or in a range from 15° to 30°.

4. The multirow roller bearing of claim 1, wherein the second inclination angle of is the same as the first inclination angle.

5. The multirow roller bearing of claim 1, wherein the first axial roller bearing row and the second axial roller bearing row are the only axial roller bearing rows between the ring nose and the ring groove.

6. The multirow roller bearing of claim 1, wherein the first axial roller bearing row and the second axial roller bearing row are the only axial roller bearing rows of the multirow roller bearing.

7. The multirow roller bearing of claim 1, wherein the radial roller bearing row is the only radial roller bearing row of the multirow roller bearing.

8. The multirow roller bearing of claim 1, wherein an angle between the first pair of axial tracks and an adjacent lateral run-on surface for the first cylindrical rollers is 90° or less, and wherein an angle between the second pair of axial tracks and an adjacent lateral run-on surface for the second cylindrical rollers is 90° or less.

9. The multirow roller bearing of claim 1, wherein the first axial roller bearing row and the second axial roller bearing row are axially aligned with one another and/or have the same bearing diameter.

10. The multirow roller bearing of claim 1, wherein the first cylindrical rollers and the second cylindrical rollers have the same diameter and have the same pressure angle.

11. The multirow roller bearing of claim 1, wherein at least one of the inner ring or the outer ring comprises a toothed portion.

12. The multirow roller bearing of claim 1, wherein the outer ring comprises the ring nose, and wherein the inner ring comprises the ring groove.

13. The multirow roller bearing of claim 1, wherein the inner ring or the outer ring has the ring groove, and wherein the inner ring or the outer ring having the ring groove is formed in two or more parts and has a dividing plane that extends approximately perpendicular to an axis of rotation of the multirow roller bearing and divides the ring groove in a region of a base of the ring groove.

14. The multirow roller bearing of claim 1, wherein the multirow roller bearing is a large roller bearing having a ring diameter of more than 1 m or more than 2.5 m or more than 4 m.

15. The multirow roller bearing of claim 1, wherein at least one of the inner ring or the outer rings is segmented.

16. A construction machine comprising the multirow roller bearing of claim 1.

17. The construction machine of claim 16, wherein the multirow roller bearing supports a slewing platform of the construction machine rotatable about an upright axis at an undercarriage of the construction machine.

18. A wind turbine having a rotor that has rotor blades adjustably supported at a hub, wherein the wind turbine has at least one multirow roller bearing of claim 1 to support a rotor blade of the rotor blades at the hub or to support the hub at a nacelle of the wind turbine.

19. A multirow roller bearing, comprising:
an inner ring and an outer ring; and
at least two axial roller bearing rows for supporting axial forces between the inner ring and the outer ring, wherein the at least two axial roller bearing rows comprise a first axial roller bearing row and a second axial roller bearing row,
wherein the first axial roller bearing row and the second axial roller bearing row are seated on opposite axial sides of a ring nose that extends radially into a ring groove and that is supported by the first axial roller bearing row and the second axial roller bearing row at the ring groove,
wherein the first axial roller bearing row comprises first cylindrical rollers rollable on a first pair of axial tracks, wherein the first pair of axial tracks are parallel to each other and inclined at a first inclination angle in a range from more than 0° to a maximum of 45°,
wherein the second axial roller bearing row comprises second cylindrical rollers rollable on a second pair of axial tracks, wherein the second pair of axial tracks are parallel to each other and inclined at a second inclination angle in a range from more than 0° to a maximum of 45°, wherein the second inclination angle is the same as or different than the first inclination angle, and
wherein the first axial roller bearing row and the second axial roller bearing row are inclined at opposite senses to one another such that the first axial roller bearing row inhibits radial movement of the ring nose out of the ring groove and such that the second axial roller bearing row inhibits radial movement of the ring nose into the ring groove.

20. A multirow roller bearing, comprising:
an inner ring and an outer ring; and
a first axial roller bearing row and a second axial roller bearing row for supporting axial forces between the inner ring and the outer ring,
wherein the first axial roller bearing row and the second axial roller bearing row are seated on opposite axial sides of a ring nose that extends radially into a ring groove and that is supported by the first axial roller bearing row and the second axial roller bearing row at the ring groove,
wherein the first axial roller bearing row comprises first cylindrical rollers rollable on a first pair of axial tracks, wherein the first pair of axial tracks are parallel to each other and inclined at a first inclination angle in a range from 1° to 8°,
wherein the second axial roller bearing row comprises second cylindrical rollers rollable on a second pair of axial tracks, wherein the second pair of axial tracks are parallel to each other and inclined at a second inclination angle in a range from 1° to 8°, wherein the second inclination angle is the same as or different than the first inclination angle,
wherein the first axial roller bearing row and the second axial roller bearing row are inclined such that the first axial roller bearing row and the second axial roller bearing row inhibit radial movement of the ring nose into the ring groove,
wherein the first axial roller bearing row and the second axial roller bearing row are the only axial roller bearing rows of the multirow roller bearing, and
wherein the multirow roller bearing is free of a radial bearing.

* * * * *